(12) United States Patent
Basamania et al.

(10) Patent No.: US 12,742,465 B2
(45) Date of Patent: Sep. 22, 2026

(54) ACTUATORS

(71) Applicant: Hamilton Sundstrand Corporation, Charlotte, NC (US)

(72) Inventors: Wojciech Basamania, Wroclaw DS (PL); Paweł Kwaśniewski, Olawa DS (PL)

(73) Assignee: Hamilton Sundstrand Corporation, Charlotte, NC (US)

( * ) Notice: Subject to any disclaimer, the term of this patent is extended or adjusted under 35 U.S.C. 154(b) by 655 days.

(21) Appl. No.: 18/191,442

(22) Filed: Mar. 28, 2023

(65) Prior Publication Data

US 2023/0304517 A1 Sep. 28, 2023

(30) Foreign Application Priority Data

Mar. 28, 2022 (EP) .................................... 22461529

(51) Int. Cl.
*F16B 2/08* (2006.01)
*F16L 23/10* (2006.01)

(52) U.S. Cl.
CPC ................. *F16B 2/08* (2013.01); *F16L 23/10* (2013.01)

(58) Field of Classification Search
CPC ........ F16B 2/08; F16L 23/10; Y10T 24/1441; F15B 2015/267; F15B 15/1433; F15B 15/262
See application file for complete search history.

(56) References Cited

U.S. PATENT DOCUMENTS 2,816,343 A 12/1957 Decker, Jr.
3,817,564 A * 6/1974 Baldwin ................ B65D 45/32 292/256.67
4,381,020 A * 4/1983 Daghe ................... F16L 21/005 24/279

(Continued)

FOREIGN PATENT DOCUMENTS

EP 1785633 A2 5/2007
JP 2002188666 A * 7/2002
WO 2016087141 A1 6/2016

OTHER PUBLICATIONS

Abstract for EP1785633 (A2), Published: May 16, 2007, 1 page.
European Search Report for Application No. 22461529.4, mailed Sep. 28, 2022, 9 pages.

*Primary Examiner* — Matthew R Mcmahon
(74) *Attorney, Agent, or Firm* — Kilpatrick Townsend & Stockton LLP

(57) ABSTRACT

An actuator arm lock suitable for use with an actuator which has an actuator arm and an actuator body. The actuator arm lock comprises a lock ring suitable for clamping around an actuator arm. The lock ring comprises a circumferentially extending element and a locking element. The circumferentially extending element comprises first and second element ends and an inner surface which faces towards the actuator arm when the actuator arm lock is in use, and the circumferentially extending element is configured to partially extend around the actuator arm. The locking element comprises first and second locking ends and is configured to extend at least between the first and second element ends of the circumferentially extending element. The first locking end of the locking element is engaged with or engageable with the first element end of the circumferentially extending element.

13 Claims, 4 Drawing Sheets

(56) References Cited

U.S. PATENT DOCUMENTS

| | | | | |
|---|---|---|---|---|
| 4,981,069 | A * | 1/1991 | Matsui | F15B 15/262<br>92/24 |
| 5,513,555 | A | 5/1996 | Plank et al. | |
| 6,009,981 | A * | 1/2000 | Wolfe | F15B 15/262<br>188/267 |
| 8,607,421 | B2 * | 12/2013 | Col | F16L 33/08<br>285/23 |
| 9,428,969 | B2 * | 8/2016 | Harbison | F16B 2/08 |
| 9,885,201 | B2 * | 2/2018 | Miyamoto | E05C 1/08 |
| 10,280,663 | B2 * | 5/2019 | Wetzel | E05C 17/30 |
| 10,723,478 | B2 | 7/2020 | Sobolak et al. | |
| 10,753,720 | B2 | 8/2020 | Schultz | |
| 10,907,712 | B2 | 2/2021 | Bastide et al. | |
| 11,953,132 | B2 * | 4/2024 | Keskin | F16L 33/2071 |
| 12,000,415 | B1 * | 6/2024 | Sessions | F16H 19/0622 |
| 2019/0100951 | A1 | 4/2019 | Wetzel et al. | |

* cited by examiner

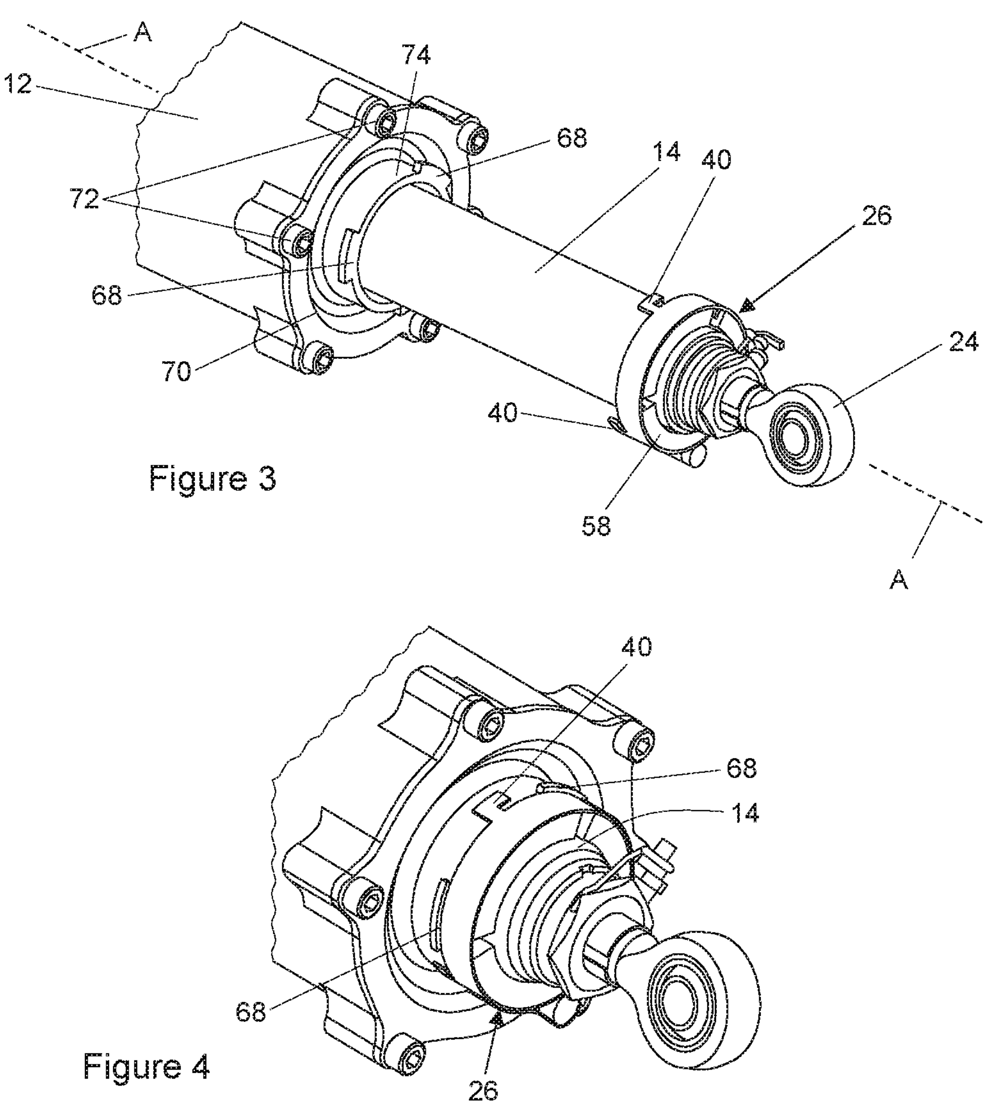
Figure 3
Figure 4
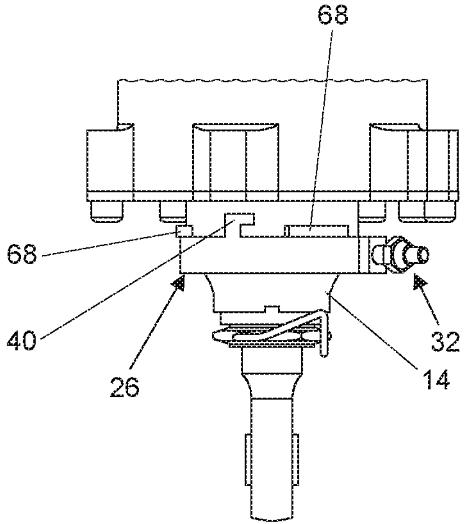
Figure 5

ACTUATORS

CROSS-REFERENCE TO RELATED APPLICATIONS

This application claims priority to European Patent Application No. 22461529.4 filed Mar. 28, 2022, the entire contents of which is incorporated herein by reference.

TECHNICAL FIELD

This disclosure relates apparatus and methods for temporary mechanically replacing actuators following actuator failure, and, in particular, to apparatus and methods for the temporary replacement of linear actuators.

BACKGROUND

It is known that many mechanisms are actuated by one or more actuators. Linear actuators are commonly used for such purposes. Linear actuators extend between an anchor position and a mechanism, and comprise an actuator body and an actuator arm. The actuator body includes anchor means for anchoring the actuator body to the anchor position, for example if the actuator is used in an aircraft by forming a pivotal connection with a structural element of an aircraft. The actuator arm has a first end within the actuator body and a second, free, end outside the actuator body. The second free end of the actuator arm is attached to the mechanism at a mechanism attachment position. When the actuator is actuated, the actuator arm can move between a retracted position where the free end of the actuator arm is in a position relatively close to the actuator body, and an extended position where the free end of the actuator arm is relatively far from the actuator body. The actuator arm and actuator body are so configured that the actuator arm cannot move other than between the retracted and extended positions.

In some circumstances the failure of an actuator, although undesirable, does not prevent use of the mechanism in which it is incorporated, and it is acceptable to mechanically replace the actuator by introducing a fixed dimension element into the actuator/mechanism system so as to emulate the actuator in its fully extended or fully retracted position. The actuator can then be repaired at a convenient time and/or location.

The fixed dimension element is typically longitudinally extending and includes or comprises first and second ends both of which are adapted to be fixed to the mechanism at the mechanism attachment position. The fixed dimension element further includes a fixation position which is located between the first and second ends and which is adapted to be fixed to the actuator body. The location of the fixation position is such that (a) the distance between the fixation position and the first end of the fixed dimension element emulates the actuator arm in the retracted position when the first end is fixed to the mechanism and the fixation position is fixed to the actuator body; and (b) the distance between the fixation position and the second end of the fixed dimension element emulates the actuator arm in the extended position when the second end is fixed to the mechanism and the fixation position is fixed to the actuator body.

When the fixed dimension element is not in use, it is fixed to the actuator body in a storage position and neither of the first and second ends are fixed to the mechanism.

SUMMARY

According to a first aspect of the present disclosure there is provided an actuator arm lock suitable for use with an actuator which has an actuator arm and an actuator body. The actuator arm lock includes a lock ring suitable for clamping around an actuator arm, the lock ring comprising a circumferentially extending element and a locking element. The circumferentially extending element includes first and second element ends and an inner surface which faces towards the actuator arm when the actuator arm lock is in use. The circumferentially extending element is configured to partially extend around an actuator arm. The locking element comprises first and second locking ends and is configured to extend at least between the first and second element ends of the circumferentially extending element. The first locking end of the locking element is engaged with or is engageable with the first element end of the circumferentially extending element. The locking element is engaged with or is engageable with the second element end of the circumferentially extending element, and the locking element may be reversibly reconfigured between a locked configuration in which the actuator arm lock clamps onto the actuator arm, and an unlocked configuration in which the actuator arm lock is loose on the actuator arm.

The actuator arm is longitudinally extending and has a longitudinal axis A, and the lock ring is suitable for clamping around the actuator arm when the lock ring extends around the actuator arm in a circumferential direction relative to the axis A. Reference to the partial surrounding of the actuator arm by the circumferentially extending element and/or the locking element is reference to the partial surrounding of the actuator arm in a circumferential direction relative to the axis A.

It is to be understood that for the purposes of the present disclosure that although actuator arms are typically cylindrical (they have a cross section that is circular in the plane perpendicular to the longitudinal axis of the actuator arm), they may be of other configurations in that they have a cross section that is not circular, for example square or rectangular, in the plane perpendicular to the longitudinal axis of the actuator arm. The present disclosure includes actuator arm locks for such actuators and, the terms ring, circumferential and related terminology is to be understood to reference a shape or direction that extends across an outer surface of the actuator arm in the plane perpendicular to the longitudinal axis of the actuator arm.

In an embodiment of any of the above embodiments, the actuator arm has a cross section that is circular in the plane perpendicular to the longitudinal axis of the actuator arm.

When the locking element is reconfigured from the unlocked to the locked configuration the locking element pulls the first and second element ends of the circumferentially extending element towards each other and as a result pulls the inner surface of the circumferentially extending element against the outer surface of the actuator arm. The magnitude of the reaction forces between the inner surface of the circumferentially extending element and the outer surface of the actuator arm is dependent on the magnitude of the force exerted by the locking element pulling the first and second element ends of the circumferentially extending element towards each other.

The magnitude of the reaction forces between the inner surface of the circumferentially extending element and the outer surface of the actuator arm determines how resistant the locking element is to sliding longitudinally along the actuator arm or circumferentially around the actuator arm.

In an embodiment of the above embodiment, the circumferentially extending element is a band or strap of material where the band or strap has a substantially rectangular cross-section in a plane perpendicular to the circumferential direction in which the circumferentially extending element extends.

In an embodiment of any of the above embodiments, the circumferentially extending element is formed from a metal or a composite material.

In an embodiment of any of the above embodiments, the circumferentially extending element is formed from a material which is elastically deformed when the locking element is reconfigured from an unlocked to a locked configuration.

In an embodiment of any of the above embodiments, the circumferentially extending element of the locking element is configured to loosely surround the first portion of an actuator arm when the first and second ends of the circumferentially extending element are not being pulled towards each other and the circumferentially extending element is not subject to stress or strain.

In an embodiment of any of the above embodiments, the circumferentially extending element surrounds at least 50%, 60%, 70%, 75%, or 80% of the circumference of the actuator arm when the locking element is in the unlocked configuration.

In an embodiment of any of the above embodiments, the locking element comprises a bar, a bearing element and a nut. The bar comprises a first locking end which is engaged with the first element end of the circumferentially extending element and a threaded portion adjacent a second locking end of the bar. The bearing element is engaged with the second element end of the circumferentially extending element and is configured to allow the bar to extend through at least part of the bearing element. The nut is in threaded engagement with the threaded portion of the bar, and the bearing element is between the nut and the first element end of the circumferentially extending element.

In an embodiment of any of the above embodiments, the first locking end of the locking element comprises a pair of trunnions or other similar pivotal elements, and the first element end of the circumferentially extending element comprises a pair of recesses, bores or channels which are each adapted to receive or retain a trunnion or other pivotal element of the locking element. In some embodiments each recess, bore or channel loosely retains a trunnion or other pivotal element and allows the trunnion or other similar pivotal element to rotate about the longitudinal axis of rotation of the trunnion or other pivotal element within the recess, bore or channel.

In an embodiment of any of the above embodiments, the bearing element comprises a pair of trunnions or other similar pivotal elements, and the second element end of the circumferentially extending element comprises a pair of recesses, bores or channels which are each adapted to receive or retain a trunnion or other pivotal element. In some embodiments each recess, bore or channel loosely retains a trunnion or other pivotal element and allows each trunnion or other similar pivotal element to rotate about the longitudinal axis of rotation of the trunnion or other pivotal element within the recess, bore or channel.

In an embodiment of any of the above embodiments, the bearing element includes a smooth bore that extends through the bearing element, and the bar of the locking element extends through the bore. In some embodiments the bar of the locking element is a sliding fit or a loose fit within the bore.

In an embodiment of any of the above embodiments, the bearing element includes a channel or notch that extends across and through a surface of the bearing element, the channel or notch is aligned with the bar of the locking element and the bar of the locking element extends along the notch or channel. In some embodiments the bar is a sliding fit or a loose fit within the notch or channel.

In an embodiment of any of the above embodiments, the nut is a hexagonal nut. In other embodiments the nut includes a threaded bore and an external configuration that can be engaged with using a suitable tool.

In an embodiment of any of the above embodiments, the locking element is a toggle clamp. In some embodiments the locking element is a hook type toggle clamp.

In an embodiment of any of the above embodiments, the locking element and circumferentially extending element are so configured that the locking element may be reversibly engaged/disengaged with the first and or second element ends of the circumferentially extending element. This has an advantage that when the locking element is disengaged from one or both of the first and or second element ends of the circumferentially extending element the circumferentially extending element may be placed around a portion of the actuator arm, and then the locking element engaged with the first and/or second element end of the circumferentially extending element to completed the surrounding of the actuator arm by the locking ring. This allows the locking ring to be placed on an actuator arm without having to disconnect the actuator arm from the mechanism. As such the locking ring can be placed onto an actuator arm as needed. In such embodiments the circumferentially extending element may be of a material that can be elastically deformed so as to allow the actuator arm to pass through the gap between the first and second element ends of the circumferentially extending element.

In an embodiment of any of the above embodiments, the circumferentially extending element comprises a circumferentially extending band and one or more portions of a gripping material. The surface of the or each portion of gripping material has a higher coefficient of friction than the surface of the circumferentially extending band, and each portion of gripping material is supported on the surface of the circumferentially extending band that faces towards the actuator arm. This is advantageous because the higher coefficient of the gripping material causes the locking element to have an increased resistance to axial and/or circumferential sliding across the surface of the actuator arm when the locking element is in the locking configuration compared to a circumferentially extending element that consists of a circumferentially extending band alone.

In an embodiment of any of the above embodiments, the circumferentially extending element comprises a circumferentially extending band and one or more portions of a gripping material, in which the gripping material has a lower resistance to indentation than the surface of the circumferentially extending band. The portions of gripping material are supported on the surface of the circumferentially extending band which faces towards the actuator arm. This is advantageous because the gripping material is less likely to damage the surface of the actuator arm when the locking element is in the locking configuration than if the circumferentially extending band were directly in contact with the surface of the actuator arm. This is particularly important in situations where the surface of the actuator arm may be contaminated with particles of material, such as grains of sand or the like, that may have a higher surface hardness than the surface of the actuator arm and/or the circumferentially extending band. In such circumstances deformation of the gripping material will minimise or avoid damage to the surface of the actuator arm because the gripping material deforms to accommodate the contaminating materials.

In an embodiment of any of the above embodiments, the gripping material is a rubber. The composition and type of the rubber may be selected to meet one or more of the anticipated operating environment (for example the operating temperature and/or the chemical environment) of the actuator and the actuator arm lock, and/or the expected forces between the actuator arm and the actuator arm lock.

In an embodiment of any of the above embodiments, the gripping material may be reversibly attachable to the circumferentially extending band. In some embodiments, an actuator arm lock kit may include a plurality of differently dimensioned portions of gripping material so that the actuator arm lock may be used with actuator arms of differently dimensioned cross sections.

In an embodiment of any of the above embodiments, the lock ring further comprises one or more first latch elements, and the first latch elements are configured to reversibly enter a latching engagement with the actuator body. The latching of the first latch elements to the actuator body causes the lock ring to be held in a fixed position, in some embodiments a fixed axial position in the direction of the central axis of the actuator arm, relative to the actuator body. This is advantageous because when the lock ring including one or more first latch elements is latched to the actuator body and the locking element is in the locking configuration, the latching holds the actuator arm in a fixed position relative to the actuator body. Advantageously the locking ring can hold the actuator arm in a fixed position between the fully retracted and fully extended positions.

In some embodiments, when the locking element is in the unlocked configuration, the latching of the locking ring to the actuator body can hold the locking ring on the actuator body in a storage position.

In an embodiment of any of the above embodiments, each first latch element is substantially L shaped.

In an embodiment of any of the above embodiments, the adaptor arm lock further comprises one or more second latch elements, each second latch element is fixed to or integral with the actuator body, and each second latch element is adapted to reversibly enter a latching engagement with the lock ring. This is again advantageous because when the actuator body is latched to the lock ring by the second latch elements, and the locking element is in the locking configuration, the latching holds the actuator arm in a fixed position relative to the actuator body. Again it is advantageous that the locking ring can hold the actuator arm in a fixed position between the fully retracted and fully extended positions. Again, in some embodiments, when the locking element is in the unlocked configuration, the latching of the locking ring to the actuator body can hold the locking ring in a storage position In an embodiment of any of the above embodiments, the adaptor arm lock further comprises a latch plate, in which the latch plate is adapted to be fixed to an actuator body, and one or both of (i) the latch plate comprises one or more second latch elements, and each second latch element is adapted to reversibly enter a latching engagement with the lock ring, and/or (ii) the latch plate comprises one or more latch means adapted to latch with the first latch elements, and each latch means is adapted to reversibly enter a latching engagement with a first latch element on the lock ring. Such a latch plate is advantageous because it may readily be attached to an existing actuator body, for example by being attached to the outside of the actuator body or by replacing an end plate of the actuator. This allows the actuator lock of the present disclosure to be retrofitted to existing actuators.

In an embodiment of any of the above embodiments, each second latch element is substantially L shaped.

In an embodiment of any of the above embodiments, each latch means comprises a bar, peg, pin, upstanding surface feature, or other surface configuration with which the first latch element may reversibly engage.

In some embodiments where the first and/or second latch elements are L shaped, the top or head of the stem of the L is joined to the circumferentially extending element or latch plate, and the horizontal bar of the L is spaced from the circumferentially extending element or latch plate, each latch means at least partially fits into the space between the horizontal bar and the circumferentially extending element or latch plate.

In an embodiment of any of the above embodiments, the engagement of at least one of the first latch elements with the actuator body, the engagement of at least one of the second latch elements with the lock ring, and/or the engagement of at least one of the first latch elements with at least one of the second latch elements is achieved by rotating the lock ring around the actuator arm.

According to a second aspect of the present disclosure there is provided an actuator comprising an actuator arm, an actuator body, and an actuator arm lock according to the first aspect of the present disclosure.

In an embodiment of any of the above embodiments, a portion of the actuator arm extends from the actuator body when the actuator arm is in a fully retracted position, the lock ring is stored on the portion of the actuator arm that extends from the actuator body when the actuator arm is in the fully retracted position, and the locking element is in the locked configuration when the lock ring is being stored.

In an embodiment of any of the above embodiments, the portion of the actuator arm that extends from the actuator body when the actuator arm is in the fully retracted position has a smaller cross section than the rest of the actuator arm, and the actuator arm lock further comprises one or more shims or packing elements suitable for placing around the portion of actuator arm with smaller cross section to emulate the cross section of the rest of the actuator arm. The lock ring can then be clamped onto the portion of actuator arm with smaller cross section and shims or packing elements or the rest of the actuator arm without reconfiguration of the locking element.

According to a third aspect of the present disclosure there is provided a method of locking an actuator arm of an actuator in a fully extended position. The method includes: (1a) locating an actuator arm lock according to the first aspect of the present disclosure on the actuator arm with the locking element in the unlocked configuration, or (1b) where a locking ring according to the first aspect of the present disclosure has been stored on the actuator arm, reconfiguring the locking element of the lock ring to the unlocked configuration, (2) moving the actuator arm to the fully extended position, (3) moving the locking ring along the actuator arm to a position adjacent to and in contact with the actuator body, and (4) reconfiguring the locking element into the locked configuration.

According to a fourth aspect of the present disclosure there is provided a method of locking an actuator arm of an actuator. The method includes: (1a) locating an actuator arm lock according to the first aspect of the present disclosure on the actuator arm with the locking element in the unlocked configuration, or (1b) where a locking ring according to the first aspect of the present disclosure has been stored on the actuator arm reconfiguring the locking element of the lock ring to the unlocked configuration, (2) moving the actuator arm to a desired degree of extension out of the actuator body, (3) moving the locking ring along the actuator arm to a position adjacent to and in contact with the actuator body, (4) engaging one or both of the first and or second latch elements (where present) with the actuator body, lock ring, both of the actuator body and lock ring, or each other, and (5) reconfiguring the locking element into the locked configuration.

In an embodiment of any of the above embodiments, the reconfiguration of the locking element from the unlocked configuration into the locked configuration introduces a predetermined amount of strain into the circumferentially extending element. This causes predetermined forces between the locking ring and the actuator arm.

The actuator arm lock of the present disclosure may be used in situations where there is actuator failure. For example, on many aircraft there are one or more air inlet ports that open through the skin of the aircraft and which face forwards when the aircraft is in flight. It is often desirable that there is a deployable flap that at least deflects air away from that/those ports when there is an increased risk that foreign objects will enter the port(s), for example during landing and take off of the aircraft. This assists in preventing or avoiding foreign objects from entering that/those ports. The flap is kept in a stored position substantially in the plane of the skin of the aircraft when the risk of foreign objects entering the port is low, for example whilst in flight. The flap is moved between deployed and stored positions by an actuator. If that actuator fails, however, it is possible for the aircraft to fly with the flap in its deployed position so that air is deflected from the port during take off and landing and during the flight. The actuator arm lock of the present disclosure can be used to fix the actuator arm in the position that corresponds to the deployed position of the flap.

The actuator arm lock of the present disclosure may also be used in maintenance or servicing operations where, for convenience and/or safely it is desirable to immobilise the actuator and/or the mechanism to which the actuator is attached.

The actuator arm lock of the present disclosure is advantageous over the known mechanical replacement of the actuator by introducing a fixed dimension element into the actuator/mechanism system so as to emulate the actuator in its fully extended or fully retracted position. This is because the actuator arm lock of the present disclosure is lighter than the known system, this reduces materials costs and fuel costs when the actuator arm lock of the present disclosure is used on aircraft. Further, the actuator arm lock of the present disclosure can be put into use to lock the actuator arm into a fixed position without the need to separate the actuator arm from the mechanism that it normally actuates. This saves on time and difficulty of deployment of the actuator arm lock of the present disclosure relative to the known fixed dimension element which requires disconnection of the actuator arm from the mechanism so that the fixed dimension element may be fixed to the mechanism. Further, the actuator arm lock of the present disclosure can be used to lock the actuator arm in any desired position. This assists in making the actuator arm lock of the present disclosure more versatile in use than the known system.

BRIEF DESCRIPTION OF THE DRAWINGS

The present invention will be further described and explained by way of example with reference to the accompanying drawings in which:

FIG. 3 shows a schematic view of the actuator of FIG. 1 with the actuator arm in its fully extended position;

FIG. 4 shows a schematic view of the actuator of FIG. 1 with the actuator arm in its fully retracted position;

FIG. 5 shows a second schematic view of the actuator of FIG. 1 with the actuator arm in its fully retracted position;

DETAILED DESCRIPTION

Figure 1:
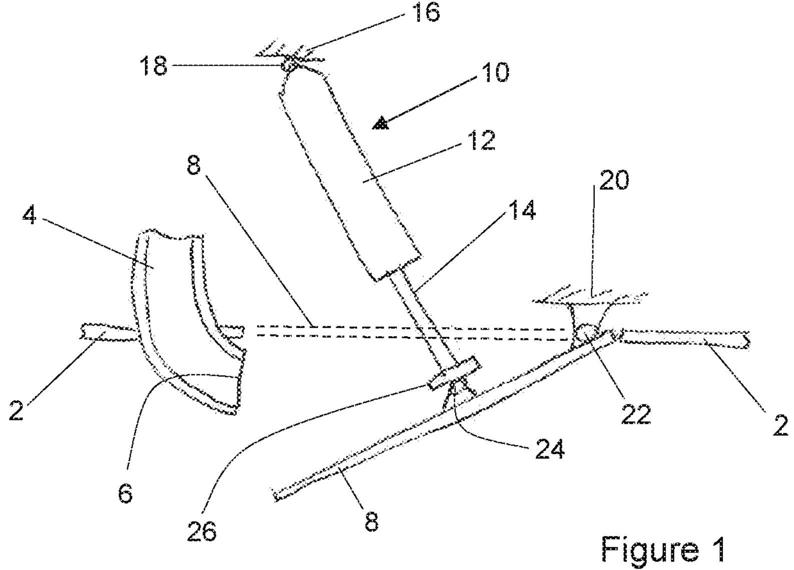
FIG. 1 shows a schematic view of an embodiment of an actuator including an embodiment of an actuator arm lock according to the present disclosure in use in an aircraft.

With reference to FIG. 1, an aircraft (not shown) has a skin 2 through which projects an inlet 4 which has a mouth 6. The mouth 6 of the inlet 4 faces forward when the aircraft is in flight. The mouth 6 is so dimensioned that in flight air is forced into the inlet 4 via the mouth 6.

It is undesirable that foreign objects such as vegetation, rubbish or birds enter the inlet 4, and as such a deployable flap 8 is provided in the skin 2 of the aircraft slightly forward of the mouth 6 of the inlet 4. The flap 8 is shown in its deployed position in solid lines and in its un-deployed position in dashed lines. The flap 8 is pivotally attached to a second structural part 20 of the aircraft via a second pivot 22 and is moved between its un-deployed and deployed positions by an actuator 10. When the flap 8 is in the deployed position the flap 8 deflects air and foreign objects from entering the inlet 4 via the mouth 6.

The actuator 10 includes an actuator body 12 and an actuator arm 14. The actuator body 12 is pivotally attached to a first structural part 16 of the aircraft via a first pivot 18. The actuator arm 14 is pivotally attached to the flap 8 via a third pivot 24. The actuator arm 14 may move between a fully extended position as shown in FIG. 1 in which the flap is in its deployed position, and a fully retracted position in which the flap 8 is aligned with the adjacent skin 2 of the aircraft. When the actuator arm 14 is in the fully retracted position a portion of the actuator arm 14 remains protruding from the actuator body 12. Mounted on the portion of the actuator arm 14 that remains protruding from the actuator body 12 when the actuator arm is in the fully retracted position is a lock ring 26 of an actuator arm lock 28.

Figure 2:
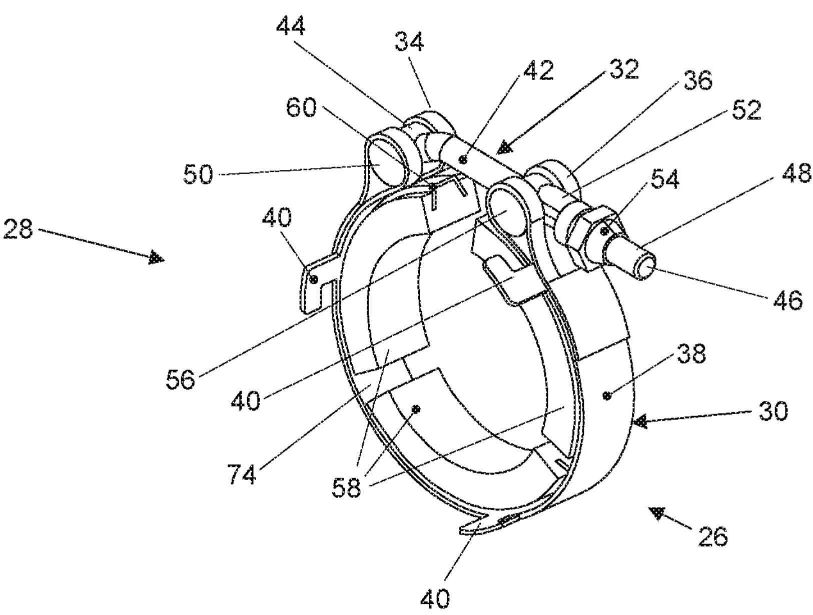
FIG. 2 shows an embodiment of a lock ring of the actuator arm lock of FIG. 1.

With reference to FIG. 2 and with continued reference to FIG. 1, the lock ring 26 includes a circumferentially extending element 30 and a locking element 32.

The circumferentially extending element 30 includes first and second element ends 34, 36 and a circumferentially extending band 38 extending between the first and second element ends 34, 36. The circumferentially extending band 38 is a flexible material such as a band of stainless steel. In other embodiments the material may be a composite material.

The locking element 32 includes a rod 42 extending between a first locking end 44 and a second locking end 46.

A threaded portion 48 of the rod 42 extends from the second locking end 46 at least partially along the rod 42 towards the first locking end 44.

The first locking end 44 of the locking element 32 includes a first pair of trunnions 50 that have a central axis that extends in a direction perpendicular to the longitudinal extent of the rod 42. The first element end 34 of the circumferentially extending element 30 is configured to extend circumferentially around a portion of each of the trunnions 50 and to trap them in the first element end 34. The engagement between the first element end 34 and the first trunnions 50 is such that the first trunnions 50 are a loose fit or a sliding fit within the first element end 34 and can rotate around their own axis.

The locking element 32 further includes a bearing element 52. The bearing element 52 includes a second pair of trunnions 56 and a bore (not shown). The bore has a longitudinally extending axis and is dimensioned to allow the rod 42 to extend through the bore. The second trunnions 56 have a central axis that extends in a direction perpendicular to the longitudinally extending axis of the bore. The second element end 36 of the circumferentially extending element 30 is configured to extend circumferentially around a portion of each of the trunnions 56 and to trap them in the second element end 36. The engagement between the second element end 36 and the second trunnions 56 is such that the second trunnions 56 are a loose fit or a sliding fit within the second element end 36 and can rotate around their own axis.

The ability of the first trunnions 50 to rotate around their own axis in the first element end 34 and the second trunnions 56 to rotate around their own axis in the second element end 36 allows the relative orientation of the first and second element ends 34, 36 of the circumferentially extending element 30 and the rod 42 of the locking element 32 to alter as the locking element moves between an unlocked configuration and a locked configuration.

The lock ring 26 further includes three portions of gripping material 58. The gripping material is a rubber material, for example a synthetic rubber material. The material selected for use as the gripping material will depend on the conditions in which the lock ring is expected to be used, and any substances to which the gripping material may be expected to be exposed to. The portions of gripping material 58 each include a reinforcing element 60. The reinforcing element 60 is sufficiently rigid that the gripping material portions 58 are bent into and/or held in a desired arcuate shape. In other embodiments the gripping material portions 58 do not include a reinforcing element 60.

The portions of gripping material 58 are attached to the inner surface 74 of the circumferentially extending band 38 that will be facing towards the actuator arm 14 when the actuator arm lock 28 is in use or the lock ring 26 is stored on the actuator arm 14.

The locking element 32 further includes a nut 54 which is in threaded engagement with the threaded portion 48 of the rod 42. The locking element 32 has two configurations, a locked configuration and an unlocked configuration. The unlocked configuration is one where the nut 54 is adjacent to or close to the second lock end 46 of the rod 42. The locked configuration is one in which the nut is closer to the first lock end of the rod 42 than it is when in the unlocked configuration.

The circumferentially extending element 30, locking element 32, and gripping material portions 58 are all so dimensioned that when the locking element 32 is in the unlocked configuration the locking ring 26 surrounds the actuator arm 14 but does not grip the actuator arm. This allows the locking ring to be moved along the actuator arm if that is desired.

The circumferentially extending element 30, locking element 32, and gripping material portions 58 are also all so dimensioned that when the locking element 32 is in its locked configuration the lock ring 26 is clamped onto or gripping the actuator arm 14 and the lock ring 26 is thus inhibited from moving along the actuator arm 14. The locking configuration may be achieved when a predetermined reaction force between the lock ring 26 and the actuator arm 14 is achieved. The reaction force between the lock ring 26 and the actuator arm 14 is caused by rotating the nut causing the nut to move along the thread of the threaded portion 48 of the rod 42 towards the first lock end of the rod 42. As the nut moves along the thread it bears against the bearing 52 and causes the first and second element ends 34, 36 of the circumferentially extending element 30 to be pulled towards each other. This causes the space between the three gripping material portions 58 to be decreased and the gripping material portions 58 to be forced into contact with the surface of the actuator arm 14.

The amount of force with which the lock ring 26 grips the actuator arm 14 (the reaction force) is related to the torque that needs to be exerted on the nut 54 to cause the nut 54 to move along the thread of the threaded portion 48. As a result, if a torque wrench is used to rotate the nut 54, the user of the torque wrench can rotate the nut 54 until a predetermined torque is needed to further rotate the nut 54 and thus a predetermined gripping force is being exerted of the actuator arm 14.

Figure 9:
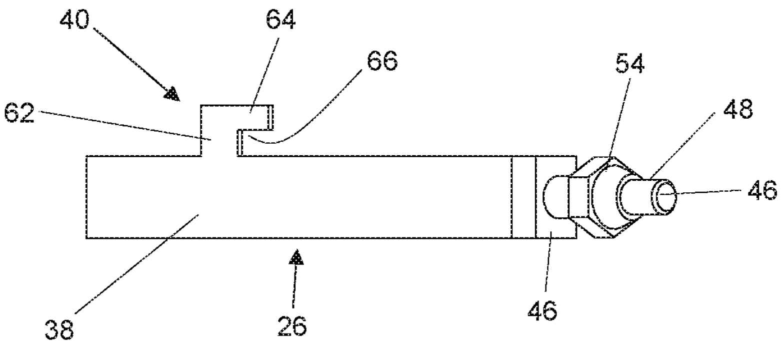
FIG. 9 shows an enlarged side view of the lock ring of FIG. 2.

The lock ring 26 further includes three first latch elements 40. The first latch elements 40 extend from the band of material 38 in a direction that is approximately parallel to the central axis of the actuator arm 14 when the lock ring 26 is located around the actuator arm 14 and the locking element 32 is in its locking configuration. The first latch elements 40 are "L" shaped and, as may be seen in detail in FIG. 9, formed from a stem 62 and a horizontal bar (or otherwise described laterally (relative to the stem 62) extending arm) 64. The arm 64, stem 62, and portion of the band of material 38 adjacent the stem 62 collectively define a space 66 between them.

With reference to FIG. 3 and with continued reference to FIGS. 1 and 2, the actuator arm lock 28 further includes three second latch means 68 (only two of which may be seen in FIG. 3) and a latch plate 70. The latch plate 70 functions as an end plate for the actuator body 12 and is attached to the actuator body 12 by six fixing means 72 (for clarity only two fixing means 72 are labelled). The fixing means 72 may be any appropriate means for attaching the latch plate 70 to the end of the actuator body 12, for example the fixing means 72 may be bolts. In other embodiments (not shown) the latch plate 70 is integral with the actuator body 12.

The latch plate 70 includes an axially extending portion 74 that surrounds the actuator arm 14 and which extends in a direction away from the actuator body 12 and parallel to the central axis A of the actuator arm 14. Extending circumferentially for a part of the outer face of the axially extending portion 74 around axis A and radially outwardly from the axially extending portion 74 are the same number of latch means 68 as there are first latch elements 40. Each latch means 68 is an arcuate flange.

The latch means 68 are so dimensioned that at least a portion of the latch means 68 may fit into the space 66 defined by the arm 64, stem 62 of the latch element 40, and the portion of the band of material 38 adjacent the stem 62.

The latch element 40 and latch means 68 are engaged with each other when at least a portion of the latch means 68 is in space 66.

The latch elements 40 and latch means 68 are so positioned on the band of material 38 and axially extending portion 74 respectively that at least part of each latch means 68 occupies the space 66 of one of the latch elements 40 at the same time. When a latch means 68 occupies the space 66 of each of the latch elements 40 the lock ring 26 is prevented from moving axially relative to the actuator body 14. When a latch means 68 occupies the space 66 of each of the latch elements 40 and the locking element 32 is in locked configuration, the lock ring 26 and actuator arm 14 are both prevented from moving axially relative to the actuator body 12.

To cause the latch elements 40 to engage with the latch means 68, the lock ring 26 is moved axially along the actuator arm 14 to a position in which the lock ring 26 abuts the axially extending portion 74. This is performed whilst the locking element 32 is in unlocked configuration. The lock ring 26 is then rotated around the axis A of the actuator arm 14 to cause at least a portion of each latch means 68 to engage with a latch element 40. The locking element 32 is then reconfigured into its locked configuration and caused to grip the actuator arm 14. The lock ring 26 and actuator body 12 are, as a result, held in a fixed position relative to each other and the actuator arm 14 is locked in position.

In other, non-illustrated embodiments there may be other numbers of latch elements 40 and latch means 68.

With reference to FIGS. 3 to 5, it may be seen that each of these Figures shows the lock ring 26 gripping a portion of the actuator arm 14 that remains outside of the actuator body 12 when the actuator arm is in its fully retracted position. The latch elements 40 and latch means 68 are not engaged with each other and, as a result, the actuator arm 14 may move between its fully retracted and fully extended positions.

Figure 6:
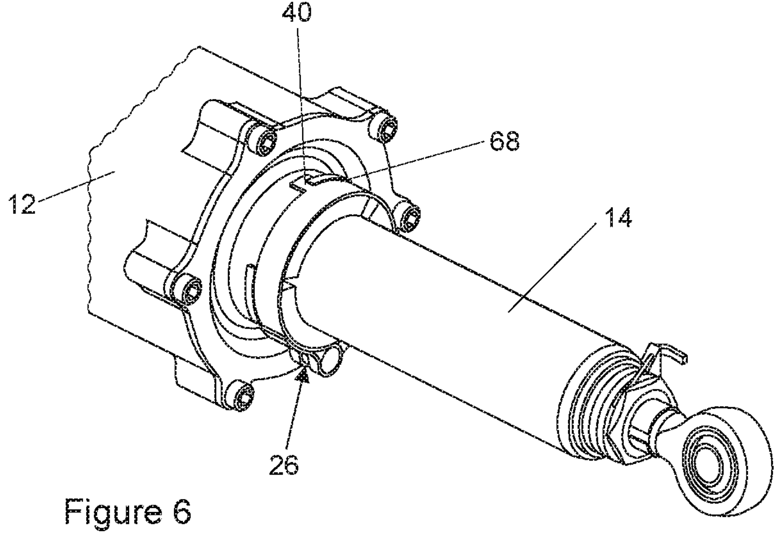
FIG. 6 shows a second schematic view of the actuator of FIG. 1 with the actuator arm in its fully extended position.

With reference to FIG. 6, it may be seen that in this Figure that the actuator arm is at or nearly at its fully extended position. The lock ring 26 has been released from gripping the actuator arm 14 (as shown in FIGS. 3 to 5) by reconfiguring the locking element 32 to the unlocked configuration, and moved axially along the actuator arm 14 until the lock ring 26 abutted the axially extending portion 74 of latch plate 70. The lock ring 26 was rotated around axis A of the actuator arm 14 and the latch elements 40 and latch means 68 engaged with each other. The locking element 32 was reconfigured to the locked configuration, and the actuator arm 14 locked in the position shown.

Figure 7:
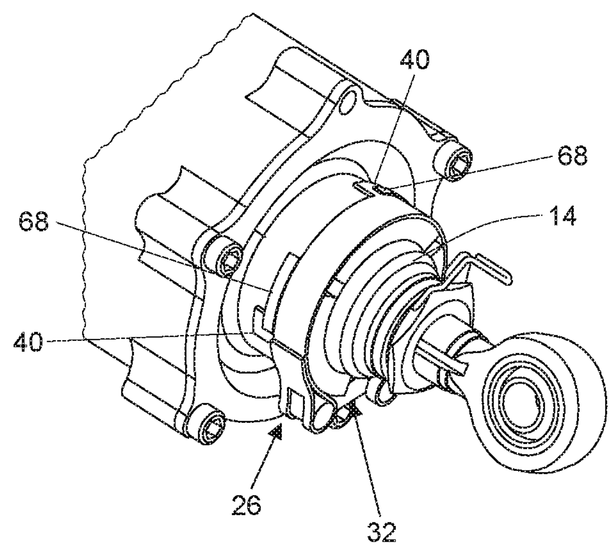
FIG. 7 shows a third schematic view of the actuator of FIG. 1 with the actuator arm in its fully retracted position.
Figure 8:
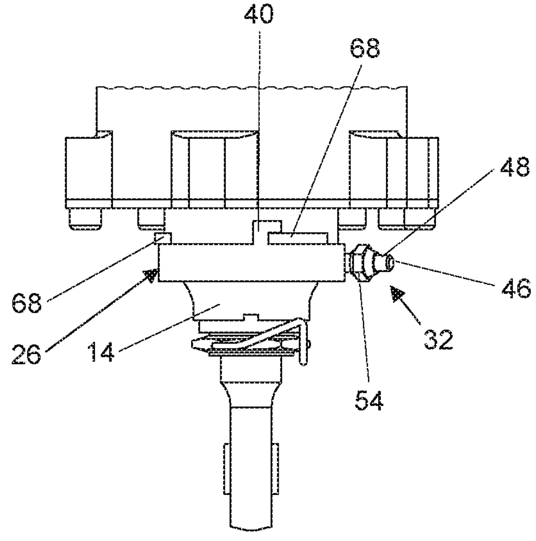
FIG. 8 shows a fourth schematic view of the actuator of FIG. 1 with the actuator arm in its fully retracted position.

With reference to FIGS. 7 and 8, it may be seen that in these Figure that the actuator arm is at its fully retracted position and in that position the lock ring 26 abuts the axially extending portion 74. The lock ring 26 has been released from gripping the actuator arm 14 (as shown in FIGS. 3 to 5) by reconfiguring the locking element 32 to the unlocked configuration, and the lock ring 26 was rotated around axis A of the actuator arm 14. The latch elements 40 and latch means 68 engaged with each other, the locking element 32 was reconfigured to the locked configuration, and the actuator arm 14 locked in the fully retracted position.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the actuator arm lock disclosed in the various embodiments may be used alone, in combination, or in a variety of arrangements not specifically discussed in the embodiments described above. This disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. An actuator arm lock suitable for use with an actuator which has an actuator arm and an actuator body, the actuator arm lock comprising:
- a lock ring suitable for clamping around an actuator arm, the lock ring comprising:
  - a circumferentially extending element; and
  - a locking element;
  - wherein the circumferentially extending element comprising:
    - first and second element ends and an inner surface which faces towards the actuator arm when the actuator arm lock is in use;
    - wherein the circumferentially extending element is configured to partially extend around the actuator arm;
    - wherein the locking element comprises first and second locking ends and is configured to extend at least between the first and second element ends of the circumferentially extending element;
    - wherein the first locking end of the locking element is engaged with or engageable with the first element end of the circumferentially extending element;
    - wherein the locking element is engaged with or engageable with the second element end of the circumferentially extending element; and
    - wherein the locking element may be reversibly reconfigured between a locked configuration in which the actuator arm lock clamps onto the actuator arm, and an unlocked configuration in which the actuator arm lock is loose on the actuator arm;
    - wherein the lock ring further comprises one or more first latch elements, and the first latch elements are configured to reversibly enter a latching engagement with the actuator body;
    - wherein the engagement of at least one of the first latch elements with the actuator body is achieved by rotating the lock ring around the actuator arm.

2. An actuator arm lock according to claim 1, in which the locking element comprises a bar, a bearing element and a nut;
- wherein the bar comprises a first locking end which is engaged with the first element end of the circumferentially extending element and a threaded portion adjacent a second locking end of the bar,
- wherein the bearing element is engaged with the second element end of the circumferentially extending element and configured to allow the bar to extend through at least part of the bearing element, wherein the nut is in threaded engagement with the threaded portion of the bar, and wherein the bearing element is between the nut and the first element end of the circumferentially extending element.

3. An actuator arm lock according to claim 1, wherein the circumferentially extending element comprises:

a circumferentially extending band and one or more portions of a gripping material, the gripping material has a surface of a higher coefficient of friction than the inner surface of the circumferentially extending band, and the portions of gripping material are supported on the inner surface of the circumferentially extending band.

4. An actuator arm lock according to claim 3, wherein the gripping material is a rubber.

5. An actuator arm lock according to claim 1, wherein the circumferentially extending element comprises:

a circumferentially extending band and one or more portions of a gripping material, in which the gripping material has a lower resistance to indentation than the inner surface of the circumferentially extending band, and the portions of gripping material are supported on the inner surface of the circumferentially extending band.

6. An actuator arm lock according to claim 5, wherein the gripping material is a rubber.

7. An actuator arm lock according to claim 1, wherein each first latch element is substantially L shaped.

8. An actuator arm lock according to claim 1, wherein the actuator arm lock further comprises one or more second latch elements, each second latch element is adapted to be fixed to or integral with the actuator body, and each second latch element is adapted to reversibly enter a latching engagement with the lock ring.

9. An actuator arm lock according to claim 1, wherein the actuator arm lock further comprises a latch plate, in which the latch plate is adapted to be fixed to the actuator body and one or both of (i) the latch plate comprises one or more second latch elements, and each second latch element is adapted to reversibly enter a latching engagement with the lock ring, and/or (ii) the latch plate comprises one or more latch means adapted to latch with the first latch elements, and each latch means is adapted to reversibly enter a latching engagement with a first latch element on the lock ring.

10. A method of locking an actuator arm of an actuator, the method comprising:

locating an actuator arm lock according to claim 9 on the actuator arm with the locking element in the unlocked configuration;

moving the actuator arm to a desired degree of extension out of the actuator body;

moving the lock ring along the actuator arm to a position adjacent to and in contact with the actuator body;

engaging one or both of the first and/or second latch elements; and reconfiguring the locking element into the locked configuration.

11. An actuator comprising an actuator arm, an actuator body, and an actuator arm lock according to claim 1.

12. An actuator according to claim 11, wherein a portion of the actuator arm extends from the actuator body when the actuator arm is in a fully retracted position, the lock ring is stored on the portion of the actuator arm that extends from the actuator body when the actuator arm is in the fully retracted position, and the locking element is in the locked configuration when the lock ring is being stored.

13. A method of locking an actuator arm of an actuator in a fully extended position, the method comprising:

locating an actuator arm lock according to claim 1 on the actuator arm with the locking element in the unlocked configuration, moving the actuator arm to the fully extended position, moving the lock ring along the actuator arm to a position adjacent to and in contact with the actuator body, and reconfiguring the locking element into the locked configuration.

* * * * *